United States Patent
Lee et al.

(10) Patent No.: US 9,146,639 B2
(45) Date of Patent: Sep. 29, 2015

(54) APPARATUS AND METHOD FOR COMPENSATING TOUCH ERROR IN ELECTRONIC DEVICE WITH TOUCH SCREEN

(71) Applicant: Samsung Electronics Co., Ltd., Gyeonggi-do (KR)

(72) Inventors: Heon-Seok Lee, Gyeonggi-do (KR); Jong-Dae Park, Gyeonggi-do (KR); Hoon-Do Heo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 117 days.

(21) Appl. No.: 13/762,883

(22) Filed: Feb. 8, 2013

(65) Prior Publication Data

US 2013/0207932 A1 Aug. 15, 2013

(30) Foreign Application Priority Data

Feb. 10, 2012 (KR) .......................... 10-2012-0013831

(51) Int. Cl.
*G06F 3/045* (2006.01)
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2011/0157077 A1 | 6/2011 | Martin et al. | |
| 2011/0187676 A1 | 8/2011 | Chang et al. | |
| 2011/0261007 A1 | 10/2011 | Joharapurkar et al. | |
| 2011/0261008 A1 | 10/2011 | Joharapurkar et al. | |
| 2011/0285636 A1* | 11/2011 | Howard et al. | 345/173 |
| 2012/0013565 A1 | 1/2012 | Westhues et al. | |
| 2012/0044151 A1* | 2/2012 | Wilson et al. | 345/173 |
| 2013/0179801 A1* | 7/2013 | Audet et al. | 715/752 |
| 2014/0204059 A1 | 7/2014 | Geaghan | |

FOREIGN PATENT DOCUMENTS

| | | |
|---|---|---|
| CN | 1979404 A | 6/2007 |
| CN | 101194221 A | 6/2008 |
| KR | 10-2011-0116426 | 10/2011 |
| WO | WO 2011053846 A1 | 5/2011 |

OTHER PUBLICATIONS

First Office Action dated Jul. 23, 2015 in connection with Chinese Patent Application No. 201310051217.0; 8 pages.

* cited by examiner

*Primary Examiner* — Nicholas Lee

(57) ABSTRACT

An apparatus and method compensate for a touch error in an electronic device with a touch screen. A method for compensating a touch error includes identifying if a touch error takes place and, when the touch error takes place, compensating the touch error using at least one touch error compensation scheme among a noise reduction filter addition scheme, a touch sensibility adjustment scheme, and a touch frequency change scheme.

20 Claims, 7 Drawing Sheets

APPARATUS AND METHOD FOR COMPENSATING TOUCH ERROR IN ELECTRONIC DEVICE WITH TOUCH SCREEN

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 10, 2012 and assigned Serial No. 10-2012-0013831, the contents of which are herein incorporated by reference.

TECHNICAL FIELD OF THE INVENTION

The present disclosure relates to an electronic device with a touch screen. More particularly, the present disclosure relates to an apparatus and method for compensating a touch error in an electronic device with a touch screen.

BACKGROUND OF THE INVENTION

Portable electronic devices becoming necessities of modern people owing to the easiness of carriage are evolving into multimedia devices providing a variety of services such as a voice and image calling function, an information input/output function, and data storage.

As the use of a multimedia service using a portable electronic device increases, information quantitation to process and display in the portable electronic device increase. This results in an increase of a concern for a portable electronic device with a touch screen capable of improving space utilization and increasing the size of a display unit.

The touch screen is an input/output device performing information input and display on one screen. According to this, if employing the touch screen, the portable electronic device can increase a display area since the portable electronic device does not require a separate input unit such as a keypad.

A touch input scheme of the portable electronic device with the touch screen includes a resistive touch scheme and a capacitive touch scheme.

If employing the resistive touch scheme, the portable electronic device determines a touch coordinate considering a pressure that is sensed at a time a user touches the touch screen with a finger and the like.

If employing the capacitive touch scheme, the portable electronic device determines the touch coordinate considering a variation of capacitance that occurs at a time the user touches the touch screen with the finger and the like.

If employing the capacitive touch scheme as above, the portable electronic device can suffer a touch recognition error due to the affection of the environment, because the portable electronic device operates by the capacitance variation. For example, the portable electronic device using the capacitive touch scheme can suffer the touch recognition error, because a capacitance variation error takes place due to the affection of the electric field and the magnetic field of the surroundings such as a fluorescent light, a microwave oven and the like. For another example, when a Travel Adapter (TA) of the unstable ground is connected to the portable electronic device, the portable electronic device may suffer the touch recognition error, because the capacitance variation is affected by unstable power supply by the TA.

SUMMARY OF THE INVENTION

To address the above-discussed deficiencies of the prior art, it is a primary object to provide an apparatus and method for compensating a touch error in an electronic device with a touch screen.

Another aspect of the present disclosure is to provide an apparatus and method for compensating a touch error in an electronic device using a capacitive touch scheme.

A further aspect of the present disclosure is to provide an apparatus and method for compensating a touch error resulting from a radiation noise in an electronic device using a capacitive touch scheme.

Yet another aspect of the present disclosure is to provide an apparatus and method for compensating a touch error resulting from unstable power supply of a Travel Adapter (TA) in an electronic device using a capacitive touch scheme.

Still another aspect of the present disclosure is to provide an apparatus and method for compensating a touch error considering a touch error occurrence count in an electronic device using a capacitive touch scheme.

Still another aspect of the present disclosure is to provide an apparatus and method for compensating a touch error using a noise reduction filter in an electronic device using a capacitive touch scheme.

Still another aspect of the present disclosure is to provide an apparatus and method for adjusting touch sensibility to compensate a touch error in an electronic device using a capacitive touch scheme.

Still another aspect of the present disclosure is to provide an apparatus and method for compensating a touch error using at least one of noise reduction filter addition, touch sensibility adjustment, and frequency change schemes in an electronic device using a capacitive touch scheme.

The above aspects are achieved by providing an apparatus and method for compensating a touch error in an electronic device with a touch screen.

According to one aspect of the present disclosure, a method for compensating a touch error in an electronic device using a capacitive touch scheme is provided. The method includes identifying if a touch error takes place and, when the touch error takes place, adding a noise reduction filter to compensate the touch error.

According to another aspect of the present disclosure, a method for compensating a touch error in an electronic device using a capacitive touch scheme is provided. The method includes identifying if a touch error takes place and, when the touch error takes place, adjusting touch sensibility to compensate the touch error.

According to a further aspect of the present disclosure, a method for compensating a touch error in an electronic device using a capacitive touch scheme is provided. The method includes identifying if a touch error takes place and, when the touch error takes place, compensating the touch error using at least one touch error compensation scheme among a noise reduction filter addition scheme, a touch sensibility adjustment scheme, and a touch frequency change scheme.

According to yet another aspect of the present disclosure, an electronic device using a capacitive touch scheme is provided. The device includes a touch screen for detecting the presence and location of a touch, one or more processors for executing computer programs, a storage unit for storing data and instructions, and one or more programs stored in the storage unit and executed by the one or more processors. When a touch error takes place, the program adds a noise reduction filter to compensate the touch error.

According to still another aspect of the present disclosure, an electronic device using a capacitive touch scheme is provided. The device includes a touch screen for detecting the presence and location of a touch, one or more processors for executing computer programs, a storage unit for storing data and instructions, and one or more programs stored in the storage unit and executed by the one or more processors. When a touch error takes place, the program adjusts touch sensibility to compensate the touch error.

According to still another aspect of the present disclosure, an electronic device using a capacitive touch scheme is provided. The device includes a touch screen for detecting the presence and location of a touch, one or more processors for executing computer programs, a storage unit for storing data and instructions, and one or more programs stored in the storage unit and executed by the one or more processors. When a touch error takes place, the program compensates the touch error using at least one touch error compensation scheme among a noise reduction filter addition scheme, a touch sensibility adjustment scheme, and a touch frequency change scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation: the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Below, the present disclosure describes a technology for compensating a touch error in an electronic device using a capacitive touch scheme.

In the following description, an electronic device includes a mobile communication terminal with a touch sensing display of a capacitive touch scheme, a Portable Digital Assistant (PDA), a laptop computer, a smart phone, a netbook, a Mobile Internet Device (MID), an Ultra Mobile Personal Computer (UMPC), a tablet PC, a navigator, an MPEG Audio Layer-3 (MP3) player and the like.

Figure 1:
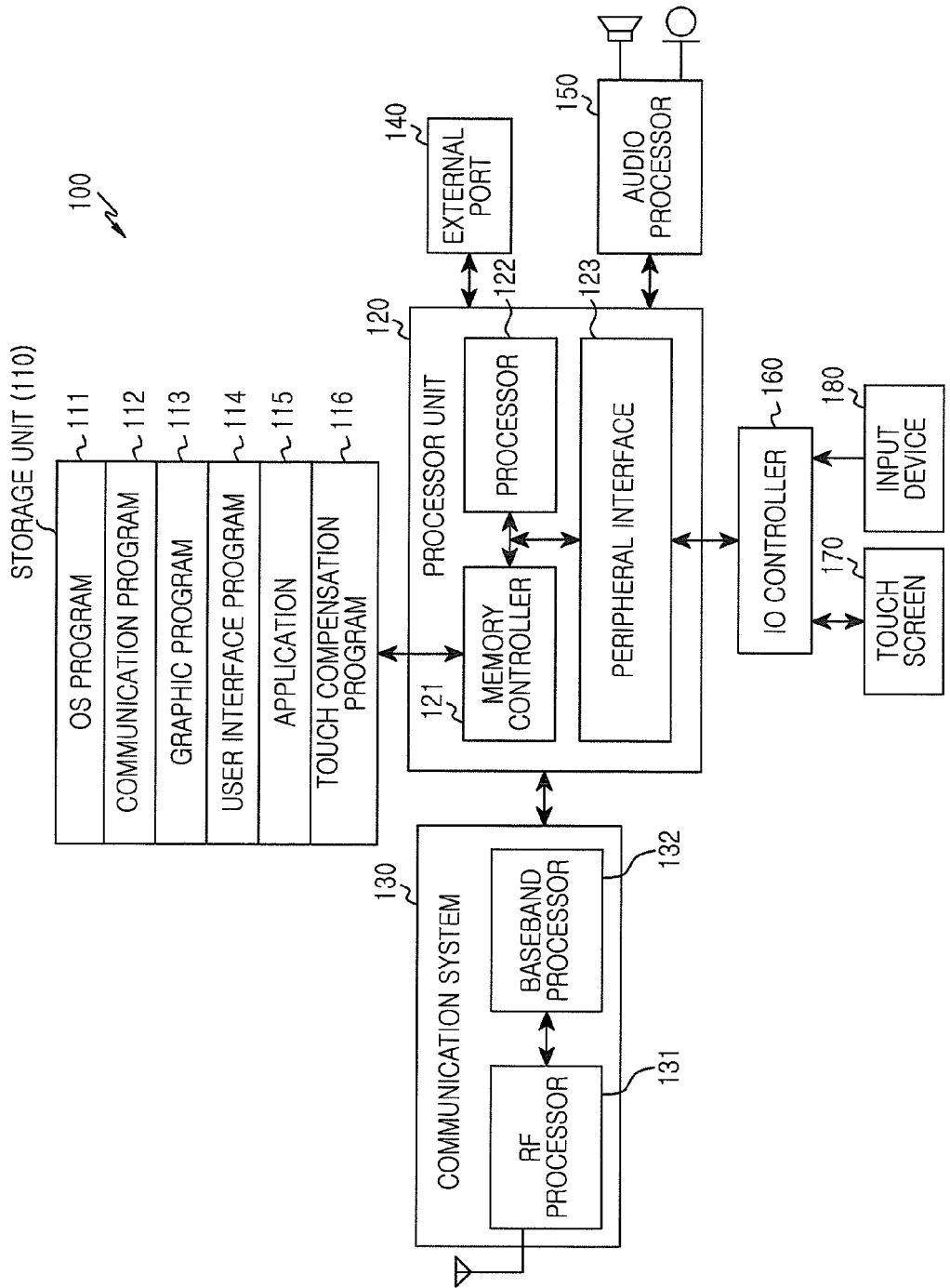
FIG. 1 illustrates a block diagram of an electronic device with a touch screen according to an exemplary embodiment of the present disclosure.

FIG. 1 illustrates a block diagram of an electronic device with a touch screen according to an exemplary embodiment of the present disclosure.

As illustrated in FIG. 1, the electronic device 100 includes a storage unit 110, a processor unit 120, a communication system 130, an external port 140, an audio processor 150, an Input Output (IO) controller 160, a touch screen 170, and an input device 180. Here, the storage unit 110 and the external port 140 may be provided in plural.

The processor unit 120 includes a memory controller 121, a processor 122, and a peripheral interface 123. Here, the processor 122 may be provided in plural.

The communication unit 130 includes a Radio Frequency (RF) processor 131 and a baseband processor 132.

The aforementioned constituent elements can be realized in hardware such as one or more integrated circuits, software, or a combination of hardware and software.

Each constituent element is described as follows.

The storage unit 110 can be composed of a program storage unit and a data storage unit. The program storage unit stores a program for controlling an operation of the electronic device 100. The data storage unit stores data generated during program execution. For example, the program storage unit includes an Operating System (OS) program 111, a communication program 112, a graphic program 113, a user interface program 114, at least one application 115, and a touch compensation program 116.

The OS program ill includes at least one software constituent element for controlling general system operation. In an exemplary embodiment, the OS program 111 performs a function of making smooth communication between a plurality of hardware (device) and software constituent elements as well.

The communication program 112 includes at least one software constituent element for processing data transmitted and received through the RF processor 131 or the external port 140.

The graphic program 113 includes at least one software constituent element for providing a user interface on the touch screen 170 by graphic.

The user interface program 114 includes at least one software constituent element related to a user interface between the electronic device 100 and a user.

The application program 115 includes a software constituent element for at least one application installed in the electronic device 100.

Figure 2:
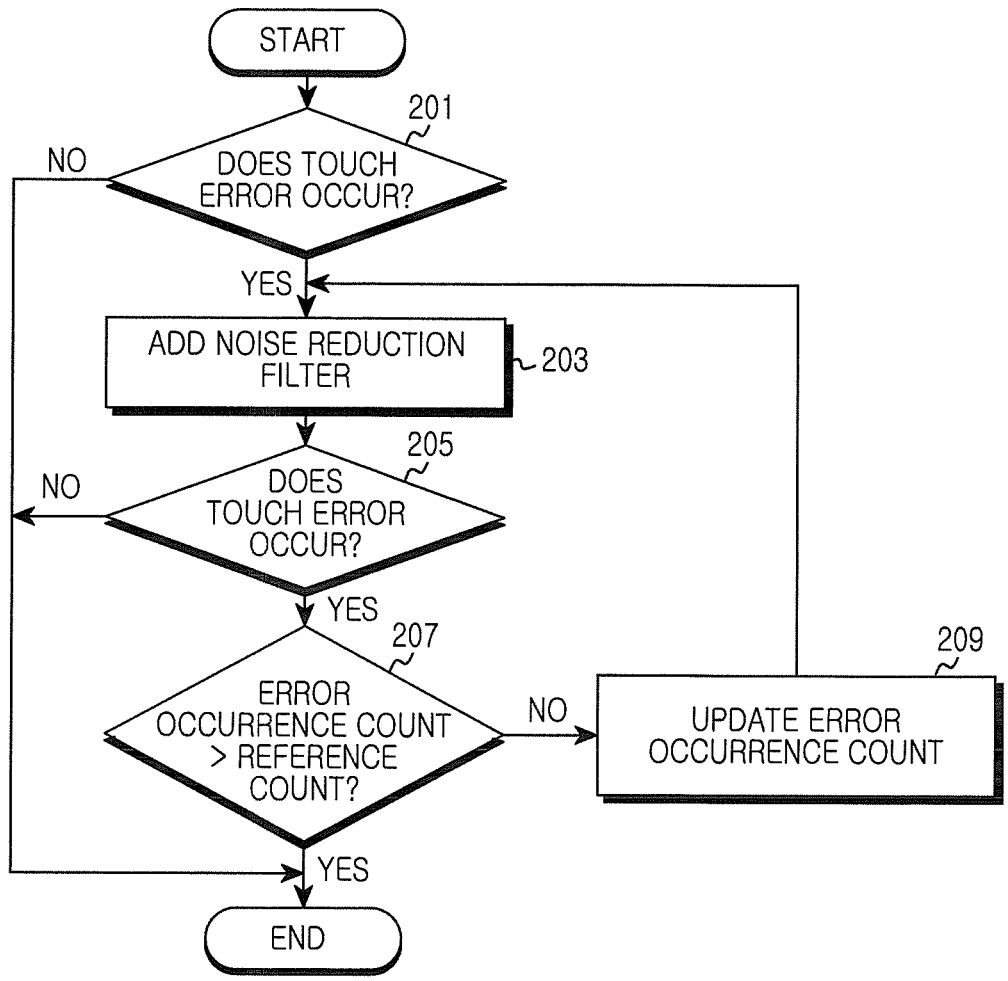
FIG. 2 illustrates a flowchart of a procedure for compensating a touch error in an electronic device with a touch screen according to a first exemplary embodiment of the present disclosure.
Figure 3:
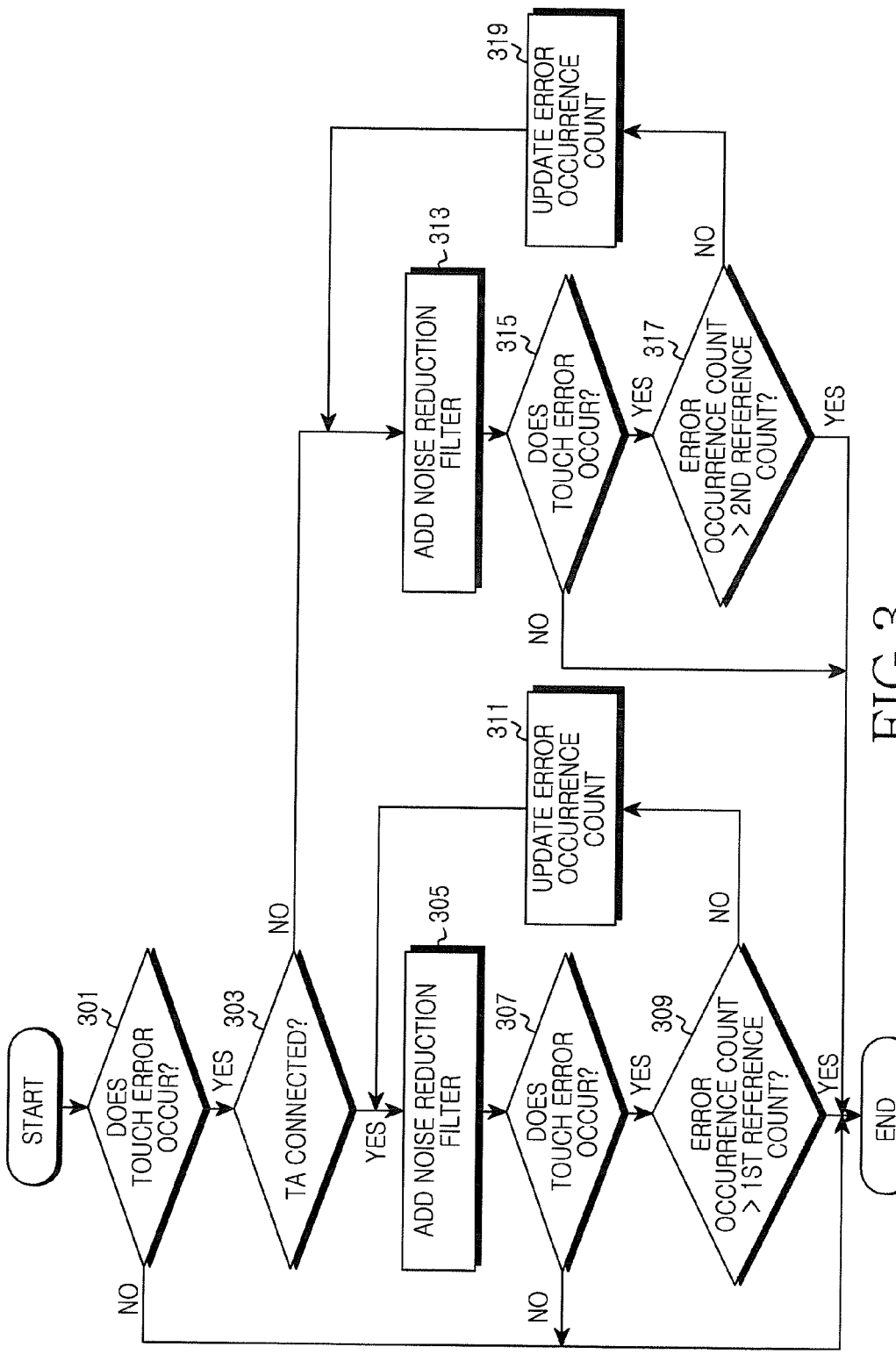
FIG. 3 illustrates a flowchart of a procedure for compensating a touch error considering connection or non-connection with a Travel Adapter (TA) in an electronic device with a touch screen according to a first exemplary embodiment of the present disclosure.
Figure 4:
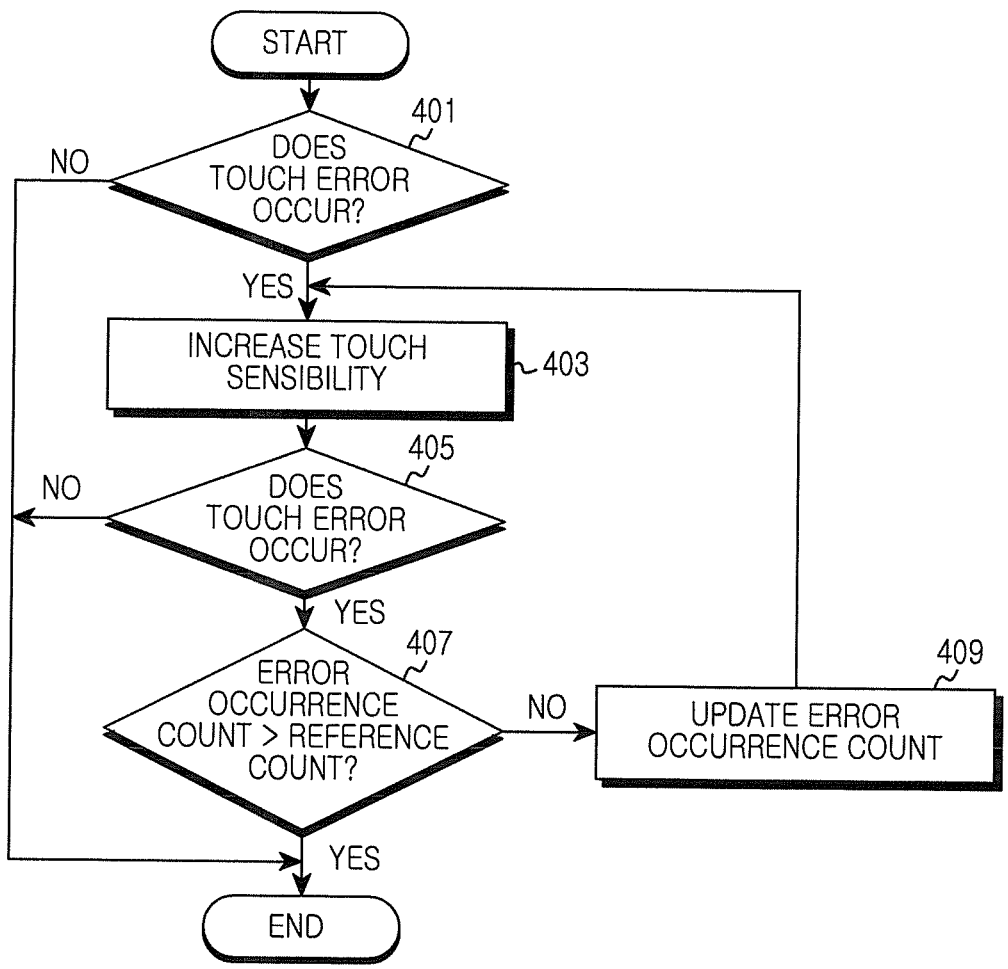
FIG. 4 illustrates a flowchart of a procedure for compensating a touch error in an electronic device with a touch screen according to a second exemplary embodiment of the present disclosure.
Figure 5:
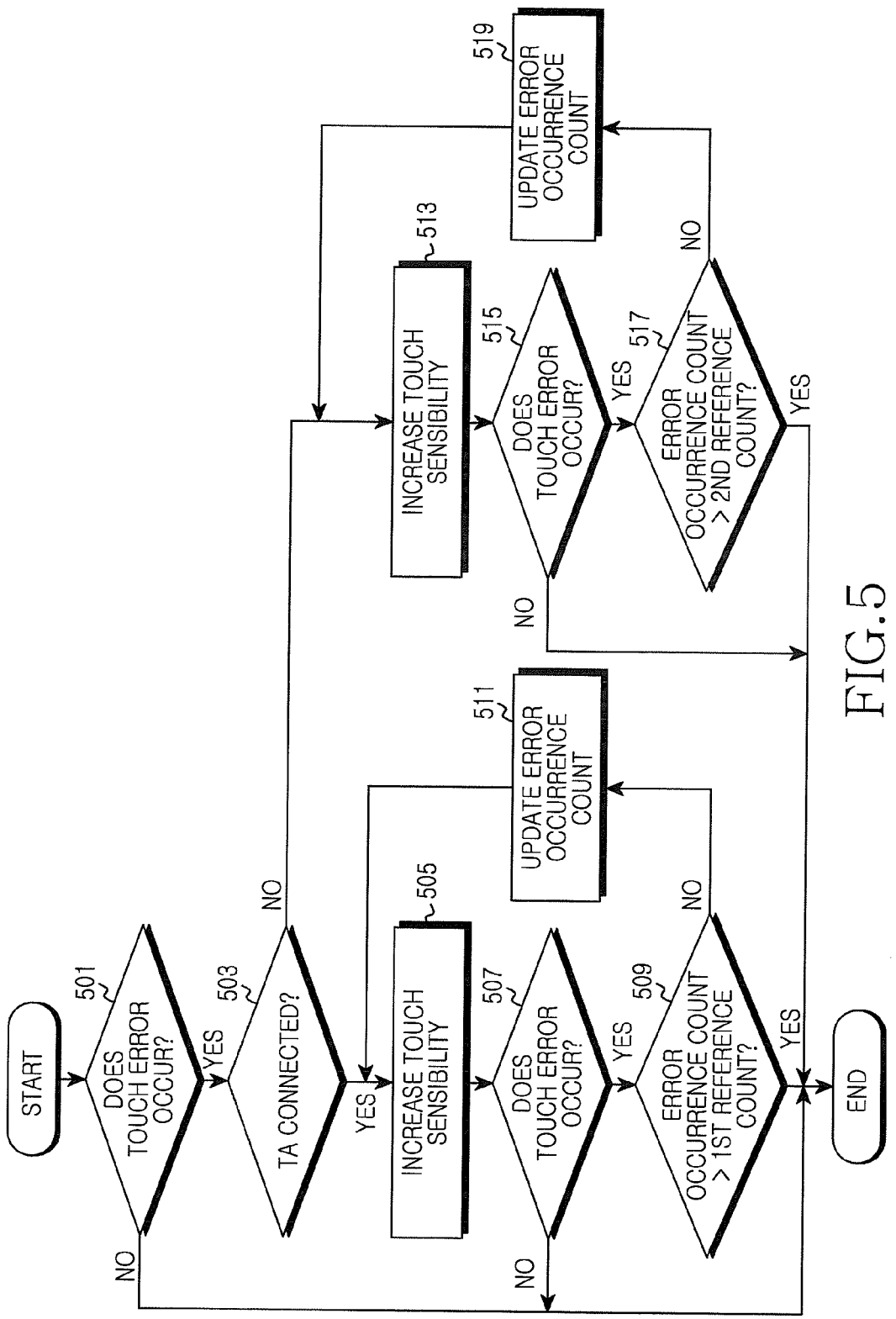
FIG. 5 illustrates a flowchart of a procedure for compensating a touch error considering connection or non-connection with a TA in an electronic device with a touch screen according to a second exemplary embodiment of the present disclosure.

The touch compensation program 116 includes a software constituent element for compensating a touch error that is recognized by a Touch Screen Panel Integrated Circuit (TSP IC) included in the IO controller 160. For example, the touch compensation program 116 includes an instruction of applying at least one noise reduction filter according to an error occurrence count to compensate a touch error as illustrated in FIG. 2 below. In an exemplary embodiment, the touch compensation program 116 can include an instruction of adjusting the number of application of the noise reduction filter according to the cause of touch error occurrence as illustrated in FIG. 3 below. For another example, the touch compensation program 116 can include an instruction of adjusting touch sensibility according to an error occurrence count to compensate a touch error as illustrated in FIG. 4 below. In an exemplary embodiment, the touch compensation program 116 may include an instruction of adjusting a touch sensibility adjustment count according to the cause of touch error occurrence as illustrated in FIG. 5 below. Here, the cause of the touch error occurrence includes at least one of a radiation noise resulting from the electric field or magnetic field of surroundings and a power noise resulting from unstable power supply.

The memory controller 121 of the processor unit 120 controls the access of the storage unit 110 to the other constituent elements such as the processor 122 or the peripheral interface 123.

The peripheral interface 123 controls connection of the processor 122 and the storage unit 110 with peripheral devices of the electronic device 100.

The processor 122 controls to provide various services such as voice communication and data communication. Also, the processor 122 controls to execute a program stored in the storage unit 110 and provide a multimedia service corresponding to the executed program. For example, when the TSP IC of the IO controller 160 recognizes a touch error, the processor 122 executes the touch compensation program 116 and compensates a touch error.

The memory controller 121, the processor 122, and the peripheral interface 123, which are included in the processor unit 120, can be realized as a single chip or a separate chip.

The RF processor 131 of the communication unit 130 processes an RF signal transmitted/received through an antenna. For example, the RF processor 131 converts a baseband signal provided from the baseband processor 132 into an RF signal, and transmits the RF signal through the antenna. Also, the RF processor 131 converts an RF signal provided through the antenna into a baseband signal, and transmits the baseband signal to the baseband processor 132. Here, the RF processor 131 includes an RF transceiver, an amplifier, a tuner, an oscillator, a digital signal processor, a Coding DECoding (CODEC) chipset, a Subscriber Identity Module (SIM) card and the like.

The external port 140 includes a connection interface for allowing the electronic device 100 to connect direct to other devices or connect indirect to the other devices through a network. For example, the external port 140 includes a charging interface for charging the electronic device 100.

The audio processor 150 provides an audio interface between the user and the electronic device 100 through a speaker and a microphone.

The IO controller 160 provides an interface between an input output device such as the touch screen 170, the input device 180 and the like, and the peripheral interface 123. In an exemplary embodiment, the IO controller 160 includes the TSP IC for determining a touch coordinate according to a capacitance variation provided through the touch screen 170.

The touch screen 170 displays status information of the electronic device 100, a character input by a user, a moving picture, a still picture and the like according to control of the graphic program 113. Also, the touch screen 170 provides the touch screen's 170 touch information to the processor unit 130 through the IO controller 160.

The input device 180 provides input data generated by user's selection to the processor unit 120 through the IO controller 160. For example, the input device 180 is constructed including only a control button for control of the electronic device 100. For another example, the input device 180 may be constructed as a keypad for receiving input data from the user.

FIG. 2 illustrates a procedure for compensating a touch error in an electronic device with a touch screen according to a first exemplary embodiment of the present disclosure.

Referring to FIG. 2, in step 201, the electronic device with the touch screen identifies if a touch error takes place. For example, when a sudden capacitance variation takes place, the electronic device recognizes that the touch error takes place. For another example, when a touch recognition position is not included in the touch screen, the electronic device can recognize that the touch error takes place.

If it is identified in step 201 that the touch error does not occur, the electronic device recognizes that touch error compensation is unnecessary, and terminates the algorithm of the present disclosure.

In contrast, if it is identified in step 201 that the touch error occurs, the electronic device proceeds to step 203 and applies a noise reduction filter to compensate the touch error. In an exemplary embodiment, the electronic device applies noise reduction filters of reference number. Here, the reference number represents the number of noise reduction filters to be applied once to compensate the touch error. The noise reduction filter includes a median filter.

After compensating the touch error, the electronic device proceeds to step 205 and identifies if a new touch error occurs even after the noise reduction filter is applied.

If it is identified in step 205 that the new touch error does not occur after the noise reduction filter is applied, the electronic device recognizes that the touch error has been compensated through the noise reduction filter applied. According to this, the electronic device terminates the algorithm of the present disclosure. In an exemplary embodiment, the electronic device initializes an error occurrence count.

In contrast, if it is identified in step 205 that the new touch error occurs even after the noise reduction filter is applied, the electronic device proceeds to step 207 and identifies if the error occurrence count is greater than a reference count in order to determine additional application or non-application of the noise reduction filter.

If it is identified in step 207 that the error occurrence count is less than or is equal to the reference count, the electronic device determines to additionally apply the noise reduction filter. According to this, the electronic device proceeds to step 209 and updates the error occurrence count. For example, the electronic device increases the error occurrence count by one level.

Next, the electronic device returns to step 203 and additionally applies the noise reduction filter to compensate the new touch error.

In contrast, if it is identified in step 207 that the error occurrence count is greater than the reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

In the aforementioned exemplary embodiment, the electronic device with the touch screen compensates a touch error using a noise reduction filter. In an exemplary embodiment, the electronic device with the touch screen may set the number of application of the noise reduction filter differently according to the cause of touch error occurrence as illustrated in FIG. 3 below. In the following description, it is assumed that the cause of the touch error occurrence includes a radiation noise resulting from the electric field or magnetic field of the surroundings, and a power noise resulting from unstable power supply.

FIG. 3 illustrates a procedure for compensating a touch error considering connection or non-connection to a Travel Adapter (TA) in an electronic device with a touch screen according to a first exemplary embodiment of the present disclosure.

Referring to FIG. 3, in step 301, the electronic device with the touch screen identifies if a touch error takes place. For example, when a sudden capacitance variation takes place, the electronic device recognizes that the touch error takes place. For another example, when a touch recognition position is not included in the touch screen, the electronic device can recognize that the touch error takes place.

If it is identified in step 301 that the touch error does not occur, the electronic device recognizes that touch error compensation is unnecessary, and terminates the algorithm of the present disclosure.

In contrast, if it is identified in step 301 that the touch error occurs, the electronic device proceeds to step 303 and identifies if a TA is connected to the electronic device. For example, the electronic device identifies whether an external power is connected to a charging interface of an external port of the electronic device.

If it is identified in step 303 that connection with the TA is made, the electronic device proceeds to step 305 and applies a noise reduction filter to compensate the touch error. In an exemplary embodiment, the electronic device applies noise reduction filters of reference number. Here, the reference number represents the number of noise reduction filters to be applied once for the sake of touch error compensation. The noise reduction filter includes a median filter.

After compensating the touch error, the electronic device proceeds to step 307 and identifies if a new touch error occurs even after the noise reduction filter is applied.

If it is identified in step 307 that the new touch error does not occur after the noise reduction filter is applied, the electronic device recognizes that the touch error has been compensated through the noise reduction filter applied. According to this, the electronic device terminates the algorithm of the present disclosure. In an exemplary embodiment, the electronic device initializes an error occurrence count.

In contrast, if it is identified in step 307 that the new touch error occurs even after the noise reduction filter is applied, the electronic device proceeds to step 309 and identifies if the error occurrence count is greater than a 1st reference count in order to determine additional application or non-application of the noise reduction filter.

If it is identified in step 309 that the error occurrence count is less than or is equal to the 1st reference count, the electronic device determines to additionally apply the noise reduction filter. According to this, the electronic device proceeds to step 311 and updates the error occurrence count. For example, the electronic device increases the error occurrence count by one level.

Next, the electronic device returns to step 305 and additionally applies the noise reduction filter to compensate the new touch error.

In contrast, if it is identified in step 309 that the error occurrence count is greater than the 1st reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

If it is identified in step 303 that the connection with the TA is not made, the electronic device proceeds to step 313 and applies a noise reduction filter to compensate the touch error. In an exemplary embodiment, the electronic device applies noise reduction filters of reference number. Here, the reference number represents the number of noise reduction filters to be applied once for the sake of touch error compensation. The noise reduction filter includes a median filter.

After compensating the touch error, the electronic device proceeds to step 315 and identifies if a new touch error occurs even after the noise reduction filter is applied.

If it is identified in step 315 that the new touch error does not occur after the noise reduction filter is applied, the electronic device recognizes that the touch error has been compensated through the noise reduction filter applied. According to this, the electronic device terminates the algorithm of the present disclosure. In an exemplary embodiment, the electronic device initializes an error occurrence count.

In contrast, if it is identified in step 315 that the new touch error occurs even after the noise reduction filter is applied, the electronic device proceeds to step 317 and identifies if the error occurrence count is greater than a 2nd reference count in order to determine additional application or non-application of the noise reduction filter. Here, the 2nd reference count is set less than the 1st reference count.

If it is identified in step 317 that the error occurrence count is less than or is equal to the 2nd reference count, the electronic device determines to additionally apply the noise reduction filter. According to this, the electronic device proceeds to step 319 and updates the error occurrence count. For example, the electronic device increases the error occurrence count by one level.

Next, the electronic device returns to step 313 and additionally applies the noise reduction filter to compensate the new touch error.

In contrast, if it is identified in step 317 that the error occurrence count is greater than the 2nd reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

As described above, the electronic device can set the number of addition of a noise reduction filter differently according to the cause of touch error occurrence. For example, because a power noise resulting from unstable power supply acts as a greater touch error than a radiation noise in the electronic device, the electronic device can set the number of addition for compensating the power noise resulting from the unstable power supply, greater than the number of addition for compensating the radiation noise.

If the touch environment for sensing a capacitance variation of a touch screen is changed, an electronic device may initialize the touch compensation algorithm illustrated in FIG. 2 or FIG. 3. For example, if a TA is connected to an electronic device compensating a touch error resulting from a radiation noise, the electronic device may initialize the touch compensation algorithm illustrated in FIG. 2 or FIG. 3. In an exemplary embodiment, the electronic device restores a noise reduction filter value identically to before the first occurrence of the touch error.

For another example, if the TA is disconnected from the electronic device compensating a touch error resulting from unstable power supply, the electronic device may initialize the touch compensation algorithm: illustrated in FIG. 2 or FIG. 3. In an exemplary embodiment, the electronic device restores a noise reduction filter value identically to before the first occurrence of the touch error.

In the aforementioned exemplary embodiment, the electronic device with the touch screen compensates a touch error using a noise reduction filter.

In another exemplary embodiment, the electronic device with the touch screen may adjust touch sensibility and compensate a touch error. For instance, as the touch sensibility is high, the electronic device using a capacitive touch scheme is more sensitive to the surrounding noise. According to this, the electronic device using the capacitive touch scheme may adjust the touch sensibility and compensate the touch error as illustrated in FIG. 4 below.

FIG. 4 illustrates a procedure for compensating a touch error in an electronic device with a touch screen according to a second exemplary embodiment of the present disclosure.

Referring to FIG. 4, in step 401, the electronic device with the touch screen identifies if a touch error takes place. For example, when a sudden capacitance variation takes place, the electronic device recognizes that the touch error takes place. For another example, when a touch recognition position is not included in the touch screen, the electronic device can recognize that the touch error takes place.

If it is identified in step 401 that the touch error does not occur, the electronic device recognizes that touch error compensation is unnecessary, and terminates the algorithm of the present disclosure.

In contrast, if it is identified in step 401 that the touch error occurs, the electronic device proceeds to step 403 and adjusts touch sensibility to compensate the touch error. For example, the electronic device increases the touch sensitivity by one level. That is, the electronic device lowers touch sensitivity by one level.

After compensating the touch error, the electronic device proceeds to step 405 and identifies if a new touch error occurs even after the touch sensibility is adjusted.

If it is identified in step 405 that the new touch error does not occur after the touch sensibility is adjusted, the electronic device recognizes that the touch error has been compensated through the adjustment of the touch sensibility. According to this, the electronic device terminates the algorithm of the present disclosure. In an exemplary embodiment, the electronic device initializes an error occurrence count.

In contrast, if it is identified in step 405 that the new touch error occurs even after the touch sensibility is adjusted, the electronic device proceeds to step 407 and identifies if the error occurrence count is greater than a reference count in order to determine additional adjustment of the touch sensibility.

If it is identified in step 407 that the error occurrence count is less than or is equal to the reference count, the electronic device determines to additionally adjust the touch sensibility. According to this, the electronic device proceeds to step 409 and updates the error occurrence count. For example, the electronic device increases the error occurrence count by one level.

Next, the electronic device returns to step 403 and additionally adjusts the touch sensibility to compensate the new touch error. For example, the electronic device increases the touch sensibility by one level. That is, the electronic device lowers the touch sensitivity by one level.

In contrast, if it is identified in step 407 that the error occurrence count is greater than the reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

In the aforementioned exemplary embodiment, the electronic device adjusts touch sensibility according to an error occurrence count to compensate a touch error. In an exemplary embodiment, the electronic device with the touch screen may set the number of adjustment of touch sensibility differently according to the cause of touch error occurrence as illustrated in FIG. 5 below. In the following description, it is assumed that the cause of the touch error occurrence includes a radiation noise resulting from the electric field or magnetic field of the surroundings, and a power noise resulting from unstable power supply.

FIG. 5 illustrates a procedure for compensating a touch error considering connection or non-connection with a TA in an electronic device with a touch screen according to a second exemplary embodiment of the present disclosure.

Referring to FIG. 5, in step 501, the electronic device with the touch screen identifies if a touch error takes place. For example, when a sudden capacitance variation takes place, the electronic device recognizes that the touch error takes place. For another example, when a touch recognition position is not included in the touch screen, the electronic device can recognize that the touch error takes place.

If it is identified in step 501 that the touch error does not occur, the electronic device recognizes that touch error compensation is unnecessary, and terminates the algorithm of the present disclosure.

In contrast, if it is identified in step 501 that the touch error occurs, the electronic device proceeds to step 503 and identifies if a TA is connected to the electronic device. For example, the electronic device identifies whether an external power is connected to a charging interface of an external port of the electronic device.

If it is identified in step 503 that connection with the TA is made, the electronic device proceeds to step 505 and adjusts touch sensitivity to compensate the touch error. For example, the electronic device increases the touch sensitivity by one level. That is, the electronic device lowers touch sensitivity by one level.

After compensating the touch error, the electronic device proceeds to step 507 and identifies if a new touch error occurs even after the touch sensitivity is adjusted.

If it is identified in step 507 that the new touch error does not occur after the touch sensitivity is adjusted, the electronic device recognizes that the touch error has been compensated through the touch sensitivity adjusted. According to this, the electronic device terminates the algorithm of the present disclosure. In an exemplary embodiment, the electronic device initializes an error occurrence count.

In contrast, if it is identified in step 507 that the new touch error occurs even after the touch sensitivity is adjusted, the electronic device proceeds to step 509 and identifies if the error occurrence count is greater than a 1st reference count in order to determine additional adjustment or non-adjustment of the touch sensitivity.

If it is identified in step 509 that the error occurrence count is less than or is equal to the 1st reference count, the electronic device determines to additionally adjust the touch sensitivity. According to this, the electronic device proceeds to step 511 and updates the error occurrence count. For example, the electronic device increases the error occurrence count by one level.

Next, the electronic device returns to step 505 and additionally adjusts the touch sensitivity to compensate the new touch error. For example, the electronic device increases the touch sensitivity by one level. That is, the electronic device lowers the touch sensitivity by one level.

In contrast, if it is identified in step 509 that the error occurrence count is greater than the 1st reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

If it is identified in step 503 that the connection with the TA is not made, the electronic device proceeds to step 513 and adjusts touch sensitivity to compensate the touch error. For example, the electronic device increases the touch sensibility by one level. That is, the electronic device lowers touch sensitivity by one level.

After compensating the touch error, the electronic device proceeds to step 515 and identifies if a new touch error occurs even after the touch sensibility is adjusted.

If it is identified in step 515 that the new touch error does not occur after the touch sensibility is adjusted, the electronic device recognizes that the touch error has been compensated through the touch sensibility adjusted. According to this, the electronic device terminates the algorithm of the present disclosure. In an exemplary embodiment, the electronic device initializes the error occurrence count.

In contrast, if it is identified in step 515 that the new touch error occurs even after the touch sensibility is adjusted, the electronic device proceeds to step 517 and identifies if the error occurrence count is greater than a 2nd reference count in order to determine additional adjustment or non-adjustment of the touch sensibility. Here, the 2nd reference count is set less than the 1st reference count.

If it is identified in step 517 that the error occurrence count is less than or is equal to the 2nd reference count, the electronic device determines to additionally adjust the touch sensibility. According to this, the electronic device proceeds to step 519 and updates the error occurrence count. For example, the electronic device increases the error occurrence count by one level.

Next, the electronic device returns to step 513 and additionally adjusts the touch sensibility to compensate the new touch error. For example, the electronic device increases the touch sensibility by one level. That is, the electronic device lowers the touch sensitivity by one level.

In contrast, if it is identified in step 517 that the error occurrence count is greater than the 2nd reference count, the electronic device recognizes that touch error compensation may not be possible because the touch error is serious. According to this, the electronic device terminates the algorithm of the present disclosure. In an exemplary embodiment, the electronic device may provide the touch error compensation impossibility information to the user. For example, the electronic device generates at least one of a warning and a warning sound that a touch noise is serious, providing the touch error compensation impossibility information to the user.

As described above, the electronic device with the touch screen can set the number of adjustment of touch sensibility differently according to the cause of touch error occurrence. For example, because a power noise resulting from unstable power supply acts as a greater touch error than a radiation noise in the electronic device, the electronic device can set the number of adjustment for compensating the power noise resulting from the unstable power supply, greater than the number of adjustment for compensating the radiation noise.

If the environment for sensing a capacitance variation of a touch screen is changed, an electronic device may initialize the touch compensation algorithm illustrated in FIG. 4 or FIG. 5. For example, if a TA is connected to an electronic device compensating a touch error resulting from a radiation noise, the electronic device may initialize the touch compensation algorithm illustrated in FIG. 4 or FIG. 5. In an exemplary embodiment, the electronic device restores touch sensibility identically to before the first occurrence of the touch error. For another example, if the TA is disconnected from the electronic device compensating a touch error resulting from unstable power supply, the electronic device may initialize the touch compensation algorithm illustrated in FIG. 4 or FIG. 5. In an exemplary embodiment, the electronic device restores touch sensibility identically to before the first occurrence of the touch error.

In the aforementioned exemplary embodiment, the electronic device with the touch screen compensates a touch error using a noise reduction filter or a touch sensibility adjustment scheme.

Figure 6:
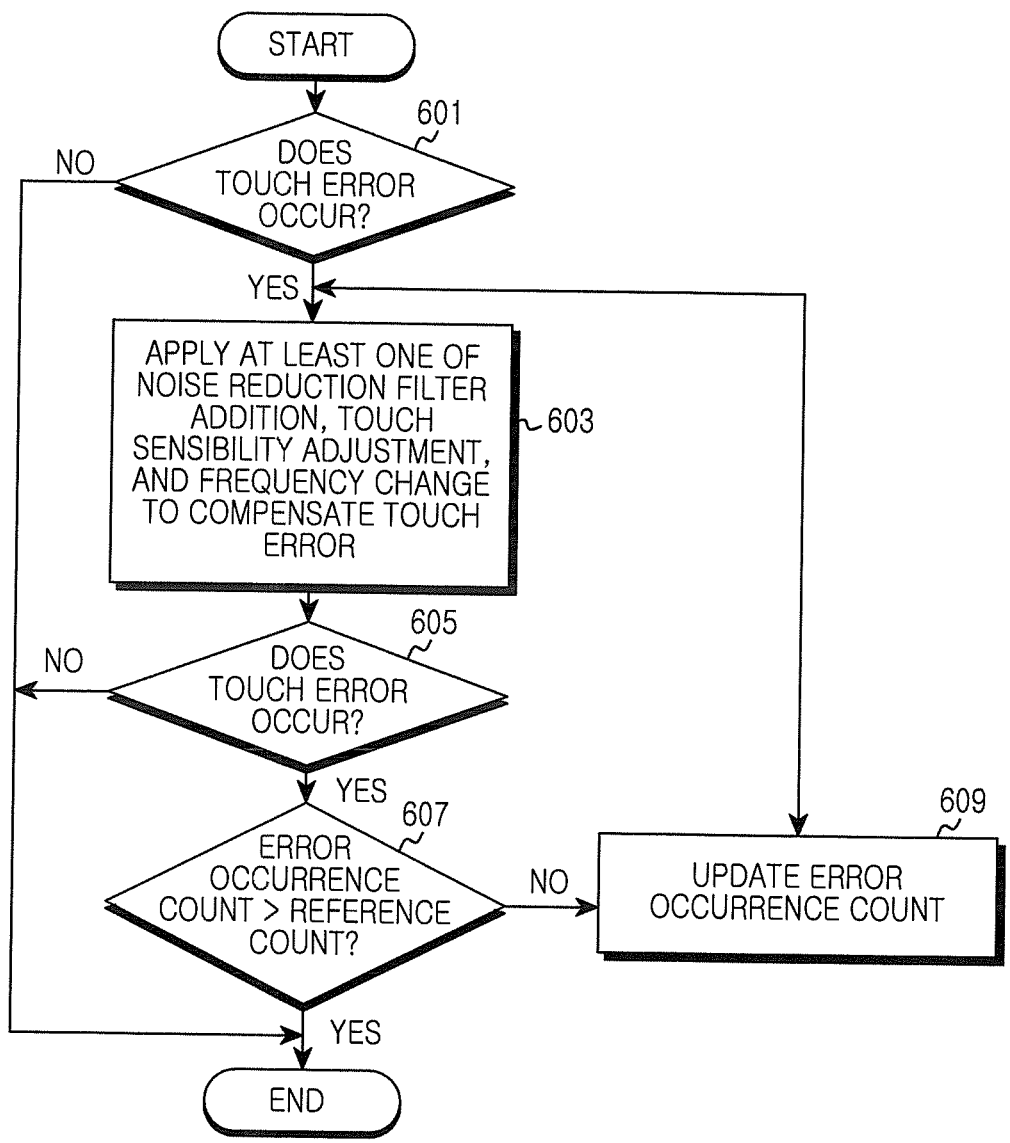
FIG. 6 illustrates a flowchart of a procedure for compensating a touch error in an electronic device with a touch screen according to a third exemplary embodiment of the present disclosure.

In another exemplary embodiment, the electronic device with the touch screen may compensate a touch error by applying at least one of a noise reduction filter, a touch sensibility adjustment scheme, and a frequency change scheme as illustrated in FIG. 6 below.

FIG. 6 illustrates a procedure for compensating a touch error in an electronic device with a touch screen according to a third exemplary embodiment of the present disclosure.

Referring to FIG. 6, in step 601, the electronic device with the touch screen identifies if a touch error takes place. For example, when a sudden capacitance variation takes place, the electronic device recognizes that the touch error takes place. For another example, when a touch recognition position is not included in the touch screen, the electronic device can recognize that the touch error takes place.

If it is identified in step 601 that the touch error does not occur, the electronic device recognizes that touch error compensation is unnecessary, and terminates the algorithm of the present disclosure.

In contrast, if it is identified in step 601 that the touch error occurs, the electronic device proceeds to step 603 and applies at least one of noise reduction filter addition, touch sensibility adjustment, and frequency change schemes to compensate the touch error. For example, the electronic device compensates the touch error using the noise reduction filter addition and touch sensibility adjustment schemes. For another example, the electronic device compensates the touch error using the noise reduction filter addition and frequency change schemes. For further example, the electronic device compensates the touch error using the touch sensibility adjustment scheme and the frequency change scheme. For yet another example, the electronic device compensates the touch error using the noise reduction filter addition scheme, the touch sensibility adjustment scheme, and the frequency change scheme. For still another example, the electronic device compensates the touch error using any one of the noise reduction filter addition scheme, the touch sensibility adjustment scheme, and the frequency change scheme. Here, the frequency change scheme represents a touch error compensation scheme of changing a frequency into any one of a plurality of available frequencies for a touch scheme.

After compensating the touch error, the electronic device proceeds to step 605 and identifies if a new touch error occurs even after the touch error is compensated.

If it is identified in step 605 that the new touch error does not occur after the touch error is compensated, the electronic device recognizes that the touch error has been compensated. According to this, the electronic device terminates the algorithm of the present disclosure. In an exemplary embodiment, the electronic device initializes an error occurrence count.

In contrast, if it is identified in step 605 that the new touch error occurs even after the touch error is compensated, the electronic device proceeds to step 607 and identifies if the error occurrence count is greater than a reference count in order to determine additional compensation or non-compensation of the touch error.

If it is identified in step 607 that the error occurrence count is less than or is equal to the reference count, the electronic device determines to additionally compensate the touch error. According to this, the electronic device proceeds to step 609 and updates the error occurrence count. For example, the electronic device increases the error occurrence count by one level.

Next, the electronic device returns to step 603 and applies at least one of the noise reduction filter addition, touch sensibility adjustment, and frequency change schemes to additionally compensate the new touch error. For example, the electronic device additionally compensates the touch error using the noise reduction filter addition and touch sensibility adjustment schemes. For another example, the electronic device additionally compensates the touch error using the noise reduction filter addition and frequency change schemes. For further example, the electronic device additionally compensates the touch error using the touch sensibility adjustment scheme and the frequency change scheme. For yet another example, the electronic device additionally compensates the touch error using the noise reduction filter addition scheme, the touch sensibility adjustment scheme, and the frequency change scheme. For still another example, the electronic device additionally compensates the touch error using any one of the noise reduction filter addition scheme, the touch sensibility adjustment scheme, and the frequency change scheme.

In contrast, if it is identified in step 607 that the error occurrence count is greater than the reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

Figure 7:
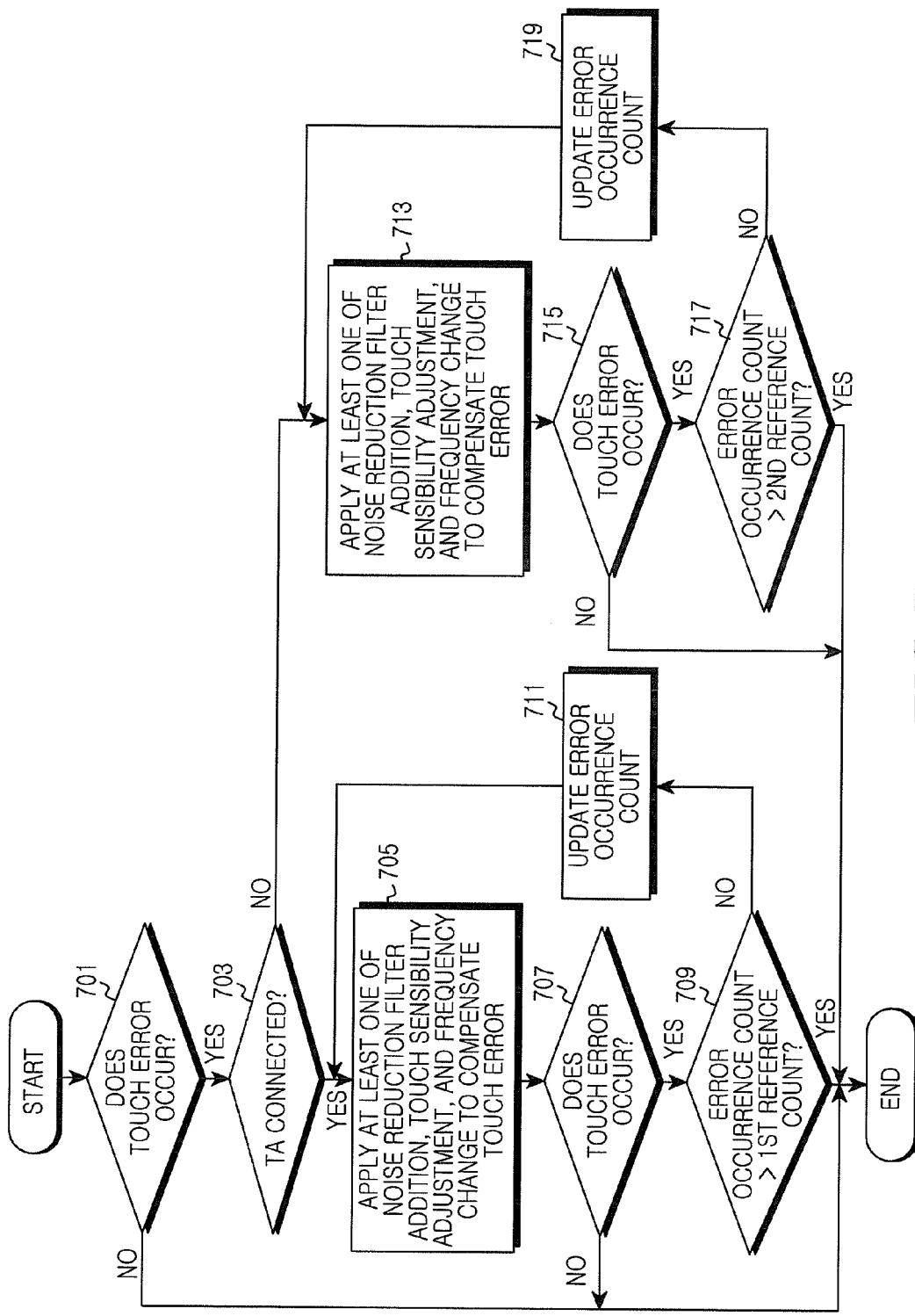
FIG. 7 illustrates a flowchart of a procedure for compensating a touch error considering connection or non-connection with a TA in an electronic device with a touch screen according to a third exemplary embodiment of the present disclosure.

In the aforementioned exemplary embodiment, the electronic device with the touch screen determines a touch compensation count according to an error occurrence count. In an exemplary embodiment, the electronic device with the touch screen may set the touch compensation count differently according to the cause of touch error occurrence as illustrated in FIG. 7 below. In the following description, it is assumed that the cause of the touch error occurrence includes a radiation noise resulting from the electric field or magnetic field of the surroundings, and a power noise resulting from unstable power supply.

FIG. 7 illustrates a procedure for compensating a touch error considering connection or non-connection with a TA in an electronic device with a touch screen according to a third exemplary embodiment of the present disclosure.

Referring to FIG. 7, in step 701, the electronic device with the touch screen identifies if a touch error takes place. For example, when a sudden capacitance variation takes place, the electronic device recognizes that the touch error takes place. For another example, when a touch recognition position is not included in the touch screen, the electronic device can recognize that the touch error takes place.

If it is identified in step 701 that the touch error does not occur, the electronic device recognizes that touch error compensation is unnecessary, and terminates the algorithm of the present disclosure.

In contrast, if it is identified in step 701 that the touch error occurs, the electronic device proceeds to step 703 and identifies if a TA is connected to the electronic device. For example, the electronic device identifies whether an external power is connected to a charging interface of an external port of the electronic device.

In contrast, if it is identified in step 703 that the TA is connected to the electronic device, the electronic device proceeds to step 705 and applies at least one of noise reduction filter addition, touch sensibility adjustment, and frequency change schemes to compensate the touch error. For example, the electronic device compensates the touch error using the noise reduction filter addition and touch sensibility adjustment schemes. For another example, the electronic device compensates the touch error using the noise reduction filter addition and frequency change schemes. For further example, the electronic device compensates the touch error using the touch sensibility adjustment scheme and the frequency change scheme. For yet another example, the electronic device compensates the touch error using the noise reduction filter addition scheme, the touch sensibility adjustment scheme, and the frequency change scheme. For still another example, the electronic device compensates the touch error using any one of the noise reduction filter addition scheme, the touch sensibility adjustment scheme, and the frequency change scheme. Here, the frequency change scheme represents a touch error compensation scheme of changing a frequency into any one of a plurality of available frequencies for a touch scheme.

After compensating the touch error, the electronic device proceeds to step 707 and identifies if a new touch error occurs even after the touch error is compensated.

If it is identified in step 707 that the new touch error does not occur after the touch error is compensated, the electronic device recognizes that the touch error has been compensated. According to this, the electronic device terminates the algorithm of the present disclosure. In an exemplary embodiment, the electronic device initializes an error occurrence count.

In contrast, if it is identified in step 707 that the new touch error occurs even after the touch error is compensated, the electronic device proceeds to step 709 and identifies if the error occurrence count is greater than a 1st reference count in order to determine additional compensation or non-compensation of the touch error.

If it is identified in step 709 that the error occurrence count is less than or is equal to the 1st reference count, the electronic device determines to additionally compensate the touch error. According to this, the electronic device proceeds to step 711 and updates the error occurrence count. For example, the electronic device increases the error occurrence count by one level.

Next, the electronic device returns to step 705 and applies at least one of the noise reduction filter addition, touch sensibility adjustment, and frequency change schemes to additionally compensate the new touch error. For example, the electronic device additionally compensates the touch error using the noise reduction filter addition and touch sensibility adjustment schemes. For another example, the electronic device additionally compensates the touch error using the noise reduction filter addition and frequency change schemes. For further example, the electronic device additionally compensates the touch error using the touch sensibility adjustment scheme and the frequency change scheme. For yet another example, the electronic device additionally compensates the touch error using the noise reduction filter addition scheme, the touch sensibility adjustment scheme, and the frequency change scheme. For still another example, the electronic device additionally compensates the touch error using any one of the noise reduction filter addition scheme, the touch sensibility adjustment scheme, and the frequency change scheme.

In contrast, if it is identified in step 709 that the error occurrence count is greater than the 1st reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

In contrast, if it is identified in step 703 that the TA is not connected to the electronic device, the electronic device proceeds to step 713 and applies at least one of the noise reduction filter addition, touch sensibility adjustment, and frequency change schemes to compensate the touch error. For example, the electronic device compensates the touch error using the noise reduction filter addition and touch sensibility adjustment schemes. For another example, the electronic device compensates the touch error using the noise reduction filter addition and frequency change schemes. For further example, the electronic device compensates the touch error using the touch sensibility adjustment scheme and the frequency change scheme. For yet another example, the electronic device compensates the touch error using the noise reduction filter addition scheme, the touch sensibility adjustment scheme, and the frequency change scheme. For still another example, the electronic device compensates the touch error using any one of the noise reduction filter addition scheme, the touch sensibility adjustment scheme, and the frequency change scheme. Here, the frequency change scheme represents a touch error compensation scheme of changing a frequency into any one of a plurality of available frequencies for a touch scheme.

After compensating the touch error, the electronic device proceeds to step 715 and identifies if a new touch error occurs even after the touch error is compensated.

If it is identified in step 715 that the new touch error does not occur after the touch error is compensated, the electronic device recognizes that the touch error has been compensated. According to this, the electronic device terminates the algorithm of the present disclosure. In an exemplary embodiment, the electronic device initializes the error occurrence count.

In contrast, if it is identified in step 715 that the new touch error occurs even after the touch error is compensated, the electronic device proceeds to step 717 and identifies if the error occurrence count is greater than a 2nd reference count in order to determine additional compensation or non-compensation of the touch error.

If it is identified in step 717 that the error occurrence count is less than or is equal to the 2nd reference count, the electronic device determines to additionally compensate the touch error. According to this, the electronic device proceeds to step 719 and updates the error occurrence count. For example, the electronic device increases the error occurrence count by one level.

Next, the electronic device returns to step 713 and applies at least one of the noise reduction filter addition, touch sensibility adjustment, and frequency change schemes to additionally compensate the new touch error. For example, the electronic device additionally compensates the touch error using the noise reduction filter addition and touch sensibility adjustment schemes. For another example, the electronic device additionally compensates the touch error using the noise reduction filter addition and frequency change schemes. For further example, the electronic device additionally compensates the touch error using the touch sensibility adjustment scheme and the frequency change scheme. For yet another example, the electronic device additionally compensates the touch error using the noise reduction filter addition scheme, the touch sensibility adjustment scheme, and the frequency change scheme. For still another example, the electronic device additionally compensates the touch error using any one of the noise reduction filter addition scheme, the touch sensibility adjustment scheme, and the frequency change scheme.

In contrast, if it is identified in step 717 that the error occurrence count is greater than the 2nd reference count, the electronic device recognizes that touch error compensation may not be possible because the touch error is serious. According to this, the electronic device terminates the algorithm of the present disclosure. In an exemplary embodiment, the electronic device may provide touch error compensation impossibility information to a user. For example, the electronic device generates at least one of a warning and a warning sound that a touch noise is serious, providing the touch error compensation impossibility information to the user.

As described above, the electronic device with the touch screen can set the number of touch compensation differently according to the cause of touch error occurrence. For example, because a power noise resulting from unstable power supply acts as a greater touch error than a radiation noise in the electronic device, the electronic device can set the number of touch compensation for compensating the power noise resulting from the unstable power supply, greater than the number of touch compensation for compensating the radiation noise.

If the touch environment for sensing a capacitance variation of a touch screen is changed, an electronic device with the touch screen may initialize the touch compensation algorithm illustrated in FIG. 6 or FIG. 7. For example, if a TA is connected to an electronic device compensating a touch error resulting from a radiation noise, the electronic device may initialize the touch compensation algorithm illustrated in FIG. 6 or FIG. 7. In an exemplary embodiment, the electronic device restores a noise reduction filter value identically to before the first occurrence of the touch error. For another example, if the TA is disconnected from the electronic device compensating a touch error resulting from unstable power supply, the electronic device may initialize the touch compensation algorithm illustrated in FIG. 6 or FIG. 7. In an exemplary embodiment, the electronic device restores a noise reduction filter value identically to before the first occurrence of the touch error.

As described above, exemplary embodiments of the present disclosure have an advantage of being capable of compensating a touch error resulting from the electric field or magnetic field of the surroundings or unstable power supply, by compensating the touch error considering a touch error occurrence count and compensating the touch error using at least one of noise reduction filter addition, touch sensibility adjustment, and frequency change schemes in an electronic device using a capacitive touch scheme.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method to compensate for a touch error in an electronic device using a capacitive touch scheme, the method comprising:
identifying that a touch error occurs;
identifying a cause of the touch error; and
compensating for the touch error using one or more touch error compensation schemes, wherein the one or more touch error compensation schemes include at least one of a noise reduction filter addition scheme, a touch sensibility adjustment scheme, or a touch frequency change scheme, and wherein compensating for the touch error includes implementing a number of touch error compensation scheme occurrences of the one or more touch error compensation schemes according to the cause of the touch error.

2. The method of claim 1, wherein the noise reduction filter addition scheme adds at least one noise reduction filter to compensate for the touch error.

3. The method of claim 2, wherein the at least one noise reduction filter includes a median filter.

4. The method of claim 1, wherein the touch sensibility adjustment scheme lowers a touch sensitivity up to a reference range to compensate for the touch error.

5. The method of claim 1, further comprising:
identifying an occurrence of an additional touch error after compensating for the touch error; and
compensating for the additional touch error using the one or more touch error compensation schemes after identifying the occurrence of the additional touch error.

6. The method of claim 5, further comprising:
identifying an error occurrence count, wherein compensating for the additional touch error occurs when the error occurrence is less than a reference count.

7. The method of claim 6, wherein the reference count is determined based on if a travel adapter (TA) is connected to the electronic device.

8. The method of claim 7, wherein the reference count comprises a first reference count when the TA is connected to the electronic device or a second reference count when the TA is not connected to the electronic device, and wherein the first reference count is greater than the second reference count.

9. The method of claim 6, further comprising generating touch error compensation impossibility information when the error occurrence count is greater than the reference count.

10. The method of claim 5, further comprising initializing an error occurrence count when the occurrence of the additional touch error is not identified.

11. An electronic device comprising one or more executable programs stored in a storage unit that when executed by one or more processors cause the one or more processors to:
identify that a touch error occurs on a touch screen;
identify a cause of the touch error; and
compensate for the touch error using one or more touch error compensation schemes, wherein the one or more touch error compensation schemes include at least one of a noise reduction filter addition scheme, a touch sensibility adjustment scheme, or a touch frequency change scheme, and wherein compensating for the touch error includes implementing a number of touch error compensation scheme occurrences of the one or more touch error compensation schemes according to the cause of the touch error.

12. The electronic device of claim 11, wherein the noise reduction filter addition scheme adds at least one noise reduction filter to compensate for the touch error.

13. The electronic device of claim 12, wherein the noise reduction filter comprises a median filter.

14. The electronic device of claim 11, wherein the touch sensibility adjustment scheme lowers a touch sensitivity up to a reference range to compensate for the touch error.

15. The electronic device of claim 11, wherein the one or more executable programs when executed by the one or more processors further cause the one or more processors to:
- identify an occurrence of an additional touch error after compensating for the touch error, and
- compensate for the additional touch error using the one or more touch error compensation schemes after identifying the occurrence of the additional touch error.

16. The electronic device of claim 15, wherein the one or more executable programs when executed by the one or more processors further cause the one or more processors to:
- identify an error occurrence count, and
- compensate for the additional touch error when the error occurrence count is less than a reference count.

17. The electronic device of claim 16, wherein the reference count is determined based on if a travel adapter (TA) is connected to the electronic device.

18. The electronic device of claim 17, wherein the reference count comprises a first reference count when the TA is connected to the electronic device or a second reference count when the TA is not connected to the electronic device, and wherein the first reference count is greater than the second reference count.

19. The electronic device of claim 16, wherein the one or more executable programs when executed by the one or more processors further cause the one or more processors to generate touch error compensation impossibility information when the error occurrence count is greater than the reference count.

20. The electronic device of claim 15, wherein the one or more executable programs when executed by the one or more processors further cause the one or more processors to initialize an error occurrence count when the occurrence of the additional touch error is not identified.

* * * * *